US008266291B2

(12) United States Patent
Heim

(10) Patent No.: US 8,266,291 B2
(45) Date of Patent: Sep. 11, 2012

(54) DYNAMIC PROPERTY VOLATILITY ASSIGNMENT AND ASSESSMENT FOR DISTRIBUTED MANAGEABLE RESOURCES

(75) Inventor: Jason M. Heim, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 325 days.

(21) Appl. No.: 12/623,718

(22) Filed: Nov. 23, 2009

(65) Prior Publication Data
US 2011/0125901 A1    May 26, 2011

(51) Int. Cl.
*G06F 15/173* (2006.01)
*G06F 15/16* (2006.01)
*H04L 12/28* (2006.01)
(52) U.S. Cl. ......... 709/226; 709/232; 709/247; 370/401
(58) Field of Classification Search .................. 709/226, 709/232, 247; 370/401
See application file for complete search history.

(56) References Cited

U.S. PATENT DOCUMENTS

| 5,864,678 A * | 1/1999 | Riddle | 709/235 |
| 2006/0013235 A1 * | 1/2006 | Farnham | 370/401 |

OTHER PUBLICATIONS

Enforce Resource Property Semantics with Metadata, retrieved from the Internet on Nov. 23, 2009, http://www.ibm.com/developerworks/autonomic/library/ac-musemeta.html, 6 pages.
Representation of CIM in XML, retrieved from the Internet on Nov. 23, 2009, http://www.dmtf.org/standards/wbem/CIM-XML/, 28 pages.
Web Services Description Language (WSDL) 1.1, retrieved from the Internet on Nov. 23, 2009, http://www.w3.org/TR/wsdl, 31 pages.
WS-CIM Mapping Specification, retrieved from the Internet on Nov. 23, 2009, http://www.dmtf.org/standards/wsman/, 60 pages.
WS-Management CIM Binding Specification, retrieved from the internet on Nov. 23, 2009, http://www.dmtf.org/standards/wsman/, 70 pages.
Web Services for Management (WS-Management) Specification, retrieved from the Internet on Nov. 23, 2009, http://www.dmtf.org/standards/wsman/, 139 pages.

\* cited by examiner

*Primary Examiner* — Wing Chan
*Assistant Examiner* — David X Yi
(74) *Attorney, Agent, or Firm* — Cantor Colburn LLP; William A. Kinnaman, Jr.

(57) ABSTRACT

A method, system, and computer program product for dynamic property volatility assessment for distributed manageable resources are provided. The method includes determining whether a property value of a remote resource has an associated volatility measurement. In response to determining that the property value of the remote resource has the associated volatility measurement, a network transaction is invoked to retrieve the property value at an interval that is less than or equal to the associated volatility measurement. In response to determining that the property value of the remote resource does not include the associated volatility measurement, a frequency-based assessment is performed comparing a frequency of change and a frequency of access for the property value. Caching the property value is performed in response to comparing the frequency-based assessment to a threshold value.

14 Claims, 2 Drawing Sheets

US 8,266,291 B2

DYNAMIC PROPERTY VOLATILITY ASSIGNMENT AND ASSESSMENT FOR DISTRIBUTED MANAGEABLE RESOURCES

BACKGROUND

The present invention relates generally to management of distributed computer-based resources, and more specifically, to dynamic property volatility assignment and assessment for distributed manageable resources.

Service infrastructures can allow for distributed heterogeneous resources to be managed using a centralized application. Management actions can include creating, retrieving, updating, and deleting resources distributed over a network using standardized management protocols. In order to remain abstract and usable by a wide variety of service infrastructures, standards such as Web Services Description Language (WSDL), Web Services Distributed Management (WSDM), Web Services Resource Properties (WS-ResourceProperties), Customer Information Manager—Extensible Markup Language (CIM-XML), and Web Services—Management (WS-MAN) have been developed that provide a means to not only access properties and methods of resources, but also to describe the resources through metadata and/or schemas.

For resource properties that are extremely volatile, such as power consumption, network throughput, and other metrics that are constantly changing, scalability can be achieved by keeping a centralized repository that tracks the history of these metrics. Typically these metrics are "pushed" or "pulled" at regular intervals and stored in a repository such as a database. This way when an end user or autonomic process needs to assess the status of the resources, the database can be quickly queried rather than invoking a slow network property retrieval to each of potentially thousands of endpoints.

Many resource properties have low volatility. An example is power status, which can be on, off, or standby, but may remain constant for weeks. Polling this status every few seconds may be extremely wasteful. Other resource properties never change during the lifetime of a resource, such as its key identifiers. The same low volatility often applies to relationships between resources. For example, a system process is typically contained in the same operating system for the duration of its lifetime.

SUMMARY

An exemplary embodiment is a method for dynamic property volatility assessment for distributed manageable resources. The method includes determining whether a property value of a remote resource has an associated volatility measurement. In response to determining that the property value of the remote resource has the associated volatility measurement, a network transaction is invoked to retrieve the property value at an interval that is less than or equal to the associated volatility measurement. In response to determining that the property value of the remote resource does not include the associated volatility measurement, a frequency-based assessment is performed comparing a frequency of change and a frequency of access for the property value. Caching the property value is performed in response to comparing the frequency-based assessment to a threshold value.

Another exemplary embodiment is a system for dynamic property volatility assessment for distributed manageable resources. The system includes a data storage system with a cache. The system also includes a resource cache manager configured to execute on a distributed resource manager and communicate with the data storage system, one or more client systems, and one or more remote resource providers. The resource cache manager is further configured to determine whether a property value of a remote resource at the one or more remote resource providers has an associated volatility measurement. In response to determining that the property value of the remote resource has the associated volatility measurement, a network transaction is invoked to retrieve the property value at an interval that is less than or equal to the associated volatility measurement. In response to determining that the property value of the remote resource does not include the associated volatility measurement, a frequency-based assessment is performed to compare a frequency of change for the property value and a frequency of access from the one or more client systems for the property value. The property value is stored in the cache in response to comparing the frequency-based assessment to a threshold value.

A further exemplary embodiment is a computer program product for dynamic property volatility assessment for distributed manageable resources. The computer program product includes a storage medium readable by a processing circuit and storing instructions for execution by the processing circuit for implementing a method. The method includes determining whether a property value of a remote resource has an associated volatility measurement. In response to determining that the property value of the remote resource has the associated volatility measurement, a network transaction is invoked to retrieve the property value at an interval that is less than or equal to the associated volatility measurement. In response to determining that the property value of the remote resource does not include the associated volatility measurement, a frequency-based assessment is performed comparing a frequency of change and a frequency of access for the property value. Caching the property value is performed in response to comparing the frequency-based assessment to a threshold value.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

Exemplary embodiments of the present invention provide dynamic property volatility assignment and assessment for distributed manageable resources. By exploiting and expanding existing metadata schemes, manageable resource providers can document and communicate the volatility of any aspect of the resource in question. This may be achieved at various levels of existing schemes. For example, Extensible Markup Language (XML) can be adapted for this purpose, although any known protocol for communicating metadata may be used. A volatility measurement can be associated with a property value of a remote resource by assignment at the class or instance level. In some cases, explicitly defining the volatility measurement may be impractical because volatility (or durability) of properties can change dependent upon a chosen configuration. In these cases, a frequency-based assessment monitors changes and access patterns of the remote resources to determine an efficient caching strategy.

Figure 1:
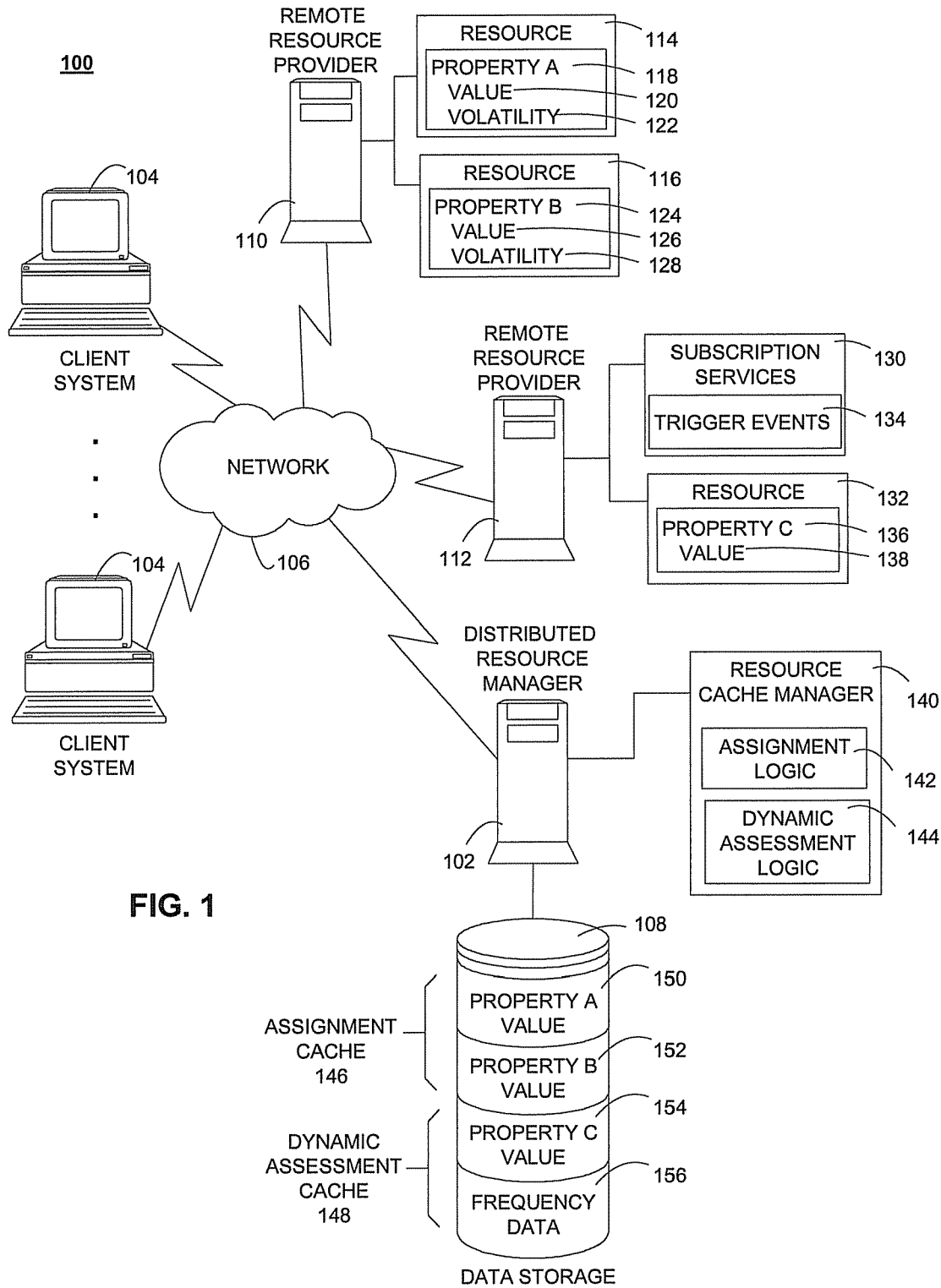
FIG. 1 depicts an example of a system for dynamic property volatility assignment and assessment for distributed manageable resources in accordance with exemplary embodiments.

Turning now to the drawings, it will be seen that in FIG. 1 there is a block diagram of a system 100 upon which dynamic property volatility assignment and assessment for distributed manageable resources is implemented in exemplary embodiments. The system 100 of FIG. 1 includes a distributed resource manager 102 in communication with client systems 104 over a network 106. In exemplary embodiments, the distributed resource manager 102 is a high-speed processing device (e.g., a mainframe computer, a desktop computer, a laptop computer, or the like) including at least one processing circuit (e.g., a CPU) capable of reading and executing instructions, and handling numerous interaction requests from the client systems 104. For instance, the distributed resource manager 102 can access a data storage system 108 to fulfill requests from the client systems 104 for data managed by the distributed resource manager 102, including cached data from remote resource providers 110 and 112.

In exemplary embodiments, the client systems 104 comprise desktop, laptop, general-purpose computer devices, and/or networked devices with processing circuits and I/O interfaces, such as a keyboard and display device. The distributed resource manager 102, client systems 104, and remote resource providers 110 and 112 can include various computer hardware and software technology known in the art, such as one or more processing units or circuits, volatile and non-volatile memory including removable media, power supplies, network interfaces, support circuitry, operating systems, and the like.

The network 106 may be any type of communications network known in the art. For example, the network 106 may be an intranet, extranet, or an internetwork, such as the Internet, or a combination thereof. The network 106 can include wireless, wired, and/or fiber optic links. Additional computer systems (not depicted) can also be accessed via the network 106 or other networks.

The data storage system 108 refers to any type of computer readable storage medium and may comprise one or more secondary storage elements, e.g., hard disk drive (HDD), tape, or a storage subsystem that is internal or external to the distributed resource manager 102. Types of data that may be stored in the data storage system 108 include, for example, various files and databases. It will be understood that the data storage system 108 shown in FIG. 1 is provided for purposes of simplification and ease of explanation and is not to be construed as limiting in scope. To the contrary, there may be multiple data storage systems 108 utilized by the distributed resource manager 102, which can be distributed in various locations of the system 100.

The remote resource providers 110 and 112 provide resources to the distributed resource manager 102 over the network 106. While only two distributed resource providers 110 and 112 are depicted in FIG. 1, there can be any number distributed resources providers included in system 100, making numerous resources (e.g., thousands) available to the distributed resource manager 102. Two example resources, resource 114 and 116, are depicted as resources of remote resource provider 110. Property A 118 of resource 114 includes a property value 120 and an associated volatility measurement 122 assigned at the class level of resource 114. The class level describes resource 114 in general terms (using XML or otherwise). For example, existing mutability and/or modifiability qualifiers can be augmented to communicate how long property value 120 is expected to last. At the class level, prior to creation of dynamic instances, expected duration of instances may be known, which can be communicated through metadata to the distributed resource manager 102.

A simplified example of using tags to define property A 118 is as follows.

```
<property>
    <name>Speed</name>
    <mutable>
        <value>true</value>
        <frequency>30</frequency>
        <units>seconds</units>
    </mutable>
</property>
```

Resource 116 includes property B 124 with property value 126 and an associated volatility measurement 128 assigned at the instance level of resource 116. In cases where volatility cannot be known until individual instances are created, qualifiers may be attached to individual instances and instance properties. The volatility measurement 128 can be consumed by distributed resource manager 102 to determine how long to cache property value 126 before requesting a refresh over network 106. Property B 124 may define a relationship between resources 114 and 116 as a reference or association. Thus, the volatility measurement 128 can define the durability of the relationship. Alternatively, relationships or associations may be assigned at the class level.

Remote resource provider 112 includes subscription services 130 and resource 132. The subscription services 130 can accept a subscription request from the distributed resource manager 102 to provide updates to resource 132. An update trigger event may be triggered as part of trigger events 134 upon a change to property C 136 of resource 132. For instance, if property value 138 of property C 136 changes, the trigger events 134 notify subscribers of the change. Subscription services 130 enable the distributed resource manager 102 to analyze the frequency of updates of property value 138 relative to access requests from the client systems 104, such that caching at the distributed resource manager 102 can be modified to improve efficiency relative to volatility of the property value 138 even though no volatility measurement is directly included in resource 132.

The distributed resource manager 102 executes a resource cache manager 140, which may include assignment logic 142 and/or dynamic assessment logic 144. The assignment logic 142 manages assignment cache 146, while dynamic assessment logic 144 manages dynamic assessment cache 148. The assignment logic 142 of resource cache manager 140 periodically caches copies of property value 120 as property A value 150 based on volatility measurement 122 and property value 126 as property B value 152 based on volatility measurement 128. The dynamic assessment logic 144 of resource cache manager 140 caches a copy of property value 138 as property C value 154 and tracks update and access frequency information in frequency data 156 to control the caching frequency of the dynamic assessment cache 148. Further details are described in reference to FIG. 2.

Figure 2:
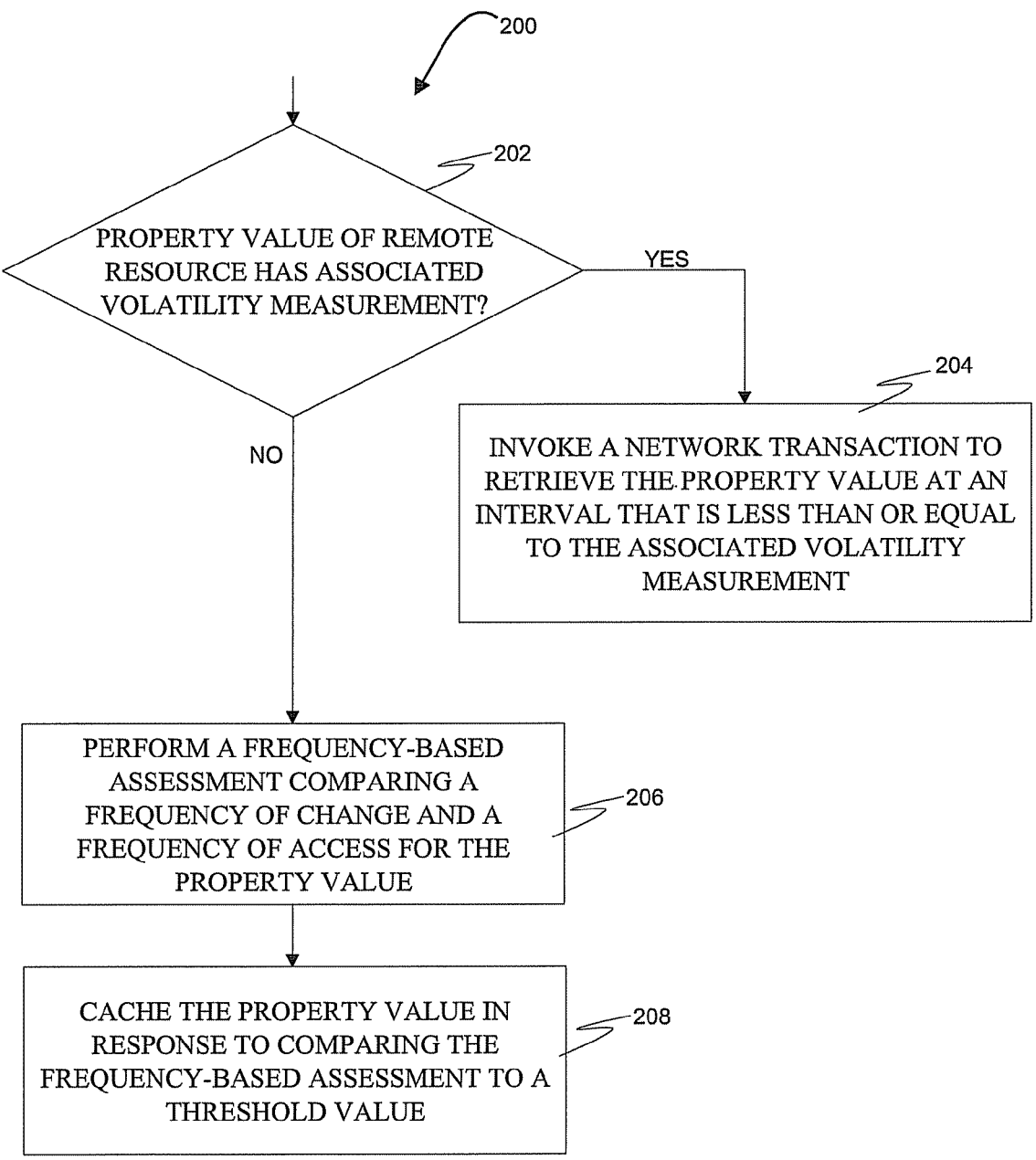
FIG. 2 depicts an exemplary process for dynamic property volatility assessment for distributed manageable resources in accordance with exemplary embodiments.

FIG. 2 depicts an exemplary process 200 for dynamic property volatility assignment and assessment for distributed manageable resources in accordance with exemplary embodiments, and is described in reference to the system 100 of FIG. 1. The distributed resource manager 102 may act as an information broker, collecting data from distributed resources 114, 116, and 132, and providing the data to client systems 104. In order to provide rapid feedback to the client systems 104, data is cached on data storage system 108. The update frequency of cached data is selected via process 200 to minimize requests to the remote resource providers 110 and 112 that result in no new data.

At block 202, the resource cache manager 140 determines whether a property value of a remote resource has an associated volatility measurement. For example, the resource cache manager 140 can request metadata for properties A 118, B 124, and C 136, and search for volatility qualifiers, such as volatility measurements 122 and 128.

At block 204, in response to determining that the property value of the remote resource has the associated volatility measurement, the resource cache manager 140 invokes a network transaction to retrieve the property value at an interval that is less than or equal to the associated volatility measurement to ensure that the data is retrieved before it becomes stale. Thus, if volatility measurement 122 indicates a time value of expected duration of property value 120 is time1, the resource cache manager 140 can send a request for an update prior to time1 elapsing, such that the updated value is available in property A value 150 prior to a request from client systems 104. Similarly, if volatility measurement 128 indicates a refresh frequency of property value 126 as frequency1, the resource cache manager 140 can periodically send a request for an update prior to the period of frequency1 elapsing, such that the updated value is available in property B value 152 prior to a request from client systems 104. The retrieval time can be dynamically determined to ensure that data is not stale (i.e., updates are retrieved), while avoiding excessive retrieval requests of unchanged data.

At block 206, in response to determining that the property value of the remote resource does not include the associated volatility measurement, the resource cache manager 140 performs a frequency-based assessment comparing a frequency of change and a frequency of access for the property value. When the frequency of access exceeds the frequency of change, there is opportunity to cache the value. For example, if property value 138 is found to be accessed ten times per hour, but only changes once per hour, then caching property value 138 as property C value 154 once per hour reduces unnecessary requests to remote resource provider 112. Conversely, if property value 138 changes ten times per hour, but is only accessed once per hour, then caching the property value 138 may provide a reduced benefit. In exemplary embodiments, the frequency-based assessment is calculated as a ratio of the frequency of change to the frequency of access for the property value.

At block 208, the resource cache manager 140 caches the property value in response to comparing the frequency-based assessment to a threshold value. The threshold value may be configurable, allowing different ratios to be used in comparing the cost of update-by-subscription versus the cost of update-by-request. If the cost of update-by-subscription is within an acceptable range of the cost of update-by-request as determined by the threshold value, the dynamic assessment cache 148 is kept current through the subscription services 130 rather than by waiting for a client system request to access the property value. The results of frequency-based assessment may be recorded in frequency data 156 so that the frequency-based assessment can optionally be shut down to reduce the performance impact on the distributed resource manager 102. Using the ratio for the frequency-based assessment, the received property value from the subscription may be stored in response to the ratio being below the threshold value; otherwise, the property value can be requested from the remote resource responsive to the client system request to access the property value.

The capabilities of the present invention can be implemented in software, firmware, hardware or some combination thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized to store instructions for execution of the resource cache manager 140 of FIG. 1. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Technical effects include selectively updating a cache with property values from remote resources based on a time value of expected duration of the property values and/or a refresh frequency of the property values. Adding a volatility measurement to a qualifier of a remote resource enables a distributed resource manager to schedule refresh requests over a network such that updates to the property values can be captured in a cache to reduce network traffic and latency issues associated with retrieving the property values from the remote resources on demand. For resources that are more difficult to predict updates, subscription-based notification of updated property values can be used. Making frequency-based assessments of changes versus access requests enables a cost-benefit analysis to determine whether caching is more efficiently performed in response to on-demand client requests or using subscription-based updates.

The diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Moreover, the use of the terms first, second, etc. do not denote any order or importance, but rather the terms first, second, etc. are used to distinguish one element from another.

What is claimed is:

1. A method for dynamic property volatility assessment for distributed manageable resources, comprising:
   determining whether a property value of a remote resource has an associated volatility measurement;
   receiving metadata comprising the associated volatility measurement, wherein the associated volatility measurement is one of: a time value of expected duration of the property value and a refresh frequency of the property value;
   wherein the associated volatility measurement is assigned at a class-level for the remote resource and the associated volatility measurement augments one of: a mutability qualifier and a modifiability qualifier;
   in response to determining that the property value of the remote resource has the associated volatility measurement, invoking a network transaction to retrieve the property value at an interval that is less than or equal to one corresponding to the associated volatility measurement; and in response to determining that the property value of the remote resource does not have an associated volatility measurement:

performing a frequency-based assessment comparing a frequency of change and a frequency of access for the property value; and caching the property value in response to comparing the frequency-based assessment to a threshold value.

2. The method of claim 1 wherein the associated volatility measurement is assigned at an instance-level for the remote resource in response to creating an instance comprising the property value.

3. The method of claim 1 wherein the property value defines a relationship between two or more resources.

4. The method of claim 1 further comprising:

requesting a subscription to receive changes to the property value;

receiving the property value from the subscription in response to an update trigger event indicating a change to the property value;

calculating a value indicating a ratio of the frequency of change to the frequency of access for the property value as the frequency-based assessment; and recording results of the frequency-based assessment.

5. The method of claim 4 wherein caching the property value in response to comparing the frequency-based assessment to the threshold value further comprises:

storing the property value received from the subscription in response to the ratio being below the threshold value; and in response to determining that the ratio is above the threshold value:

requesting the property value from the remote resource responsive to a client system request to access the property value;

receiving the property value from the remote resource responsive to the client system request; and storing the property value from the remote resource responsive to the client system request.

6. A system for dynamic property volatility assessment for distributed manageable resources, comprising:

a data storage system comprising a cache; and a resource cache manager configured to execute on a distributed resource manager and communicate with the data storage system, one or more client systems, and one or more remote resource providers, the resource cache manager further configured to perform:

determining whether a property value of a remote resource at the one or more remote resource providers has an associated volatility measurement;

receiving metadata comprising the associated volatility measurement, wherein the associated volatility measurement is one of: a time value of expected duration of the property value and a refresh frequency of the property value;

wherein the associated volatility measurement is assigned at a class-level for the remote resource and the associated volatility measurement augments one of: a mutability qualifier and a modifiability qualifier;

in response to determining that the property value of the remote resource has the associated volatility measurement, invoking a network transaction to retrieve the property value at an interval that is less than or equal to one corresponding to the associated volatility measurement; and in response to determining that the property value of the remote resource does not have an associated volatility measurement:

performing a frequency-based assessment comparing a frequency of change for the property value and a frequency of access from the one or more client systems for the property value; and storing the property value in the cache in response to comparing the frequency-based assessment to a threshold value.

7. The system of claim 6 wherein the associated volatility measurement is assigned at an instance-level for the remote resource in response to creating an instance comprising the property value.

8. The system of claim 6 wherein the resource cache manager is further configured to perform:

requesting a subscription to receive changes to the property value from one of the one or more remote resource providers;

receiving the property value from the subscription in response to an update trigger event indicating a change to the property value;

calculating a value indicating a ratio of the frequency of change for the property value to the frequency of access from the one or more client systems for the property value as the frequency-based assessment; and recording results of the frequency-based assessment in the data storage system.

9. The system of claim 8 wherein storing the property value in the cache in response to comparing the frequency-based assessment to the threshold value further comprises:

storing the received property value from the subscription in response to the ratio being below the threshold value; and in response to determining that the ratio is above the threshold value:

requesting the property value from the remote resource responsive to a client system request from the one or more client systems to access the property value;

receiving the property value from the remote resource responsive to the client system request; and storing the property value from the remote resource responsive to the client system request.

10. A computer program product for dynamic property volatility assessment for distributed manageable resources, the computer program product comprising:

a non-transitory storage medium readable by a processing circuit and storing instructions for execution by the processing circuit for implementing a method, the method comprising:

determining whether a property value of a remote resource has an associated volatility measurement;

receiving metadata comprising the associated volatility measurement, wherein the associated volatility measurement is one of: a time value of expected duration of the property value and a refresh frequency of the property value;

wherein the associated volatility measurement is assigned at a class-level for the remote resource and the associated volatility measurement augments one of: a mutability qualifier and a modifiability qualifier;

in response to determining that the property value of the remote resource has the associated volatility measurement, invoking a network transaction to retrieve the property value at an interval that is less than or equal to one corresponding to the associated volatility measurement; and in response to determining that the property value of the remote resource does not include the associated volatility measurement:

performing a frequency-based assessment comparing a frequency of change and a frequency of access for the property value; and caching the property value in response to comparing the frequency-based assessment to a threshold value.

11. The computer program product of claim 10 wherein the associated volatility measurement is assigned at an instance-level for the remote resource in response to creating an instance comprising the property value.

12. The computer program product of claim 10 wherein the property defines a relationship between two or more resources.

13. The computer program product of claim 10 wherein the method further comprises:

requesting a subscription to receive changes to the property value;

receiving the property value from the subscription in response to an update trigger event indicating a change to the property value;

calculating a value indicating a ratio of the frequency of change to the frequency of access for the property value as the frequency-based assessment; and recording results of the frequency-based assessment.

14. The computer program product of claim 13 wherein caching the property value in response to comparing the frequency-based assessment to the threshold value further comprises:

storing the received property value from the subscription in response to the ratio being below the threshold value; and in response to determining that the ratio is above the threshold value:

requesting the property value from the remote resource responsive to a client system request to access the property value;

receiving the property value from the remote resource responsive to the client system request; and storing the property value from the remote resource responsive to the client system request.

* * * * *